United States Patent [19]
Chiba

[11] 3,963,277
[45] June 15, 1976

[54] VEHICLE BRAKE SYSTEM

[75] Inventor: Haruo Chiba, Ageo, Japan

[73] Assignee: Sanwa Seiki Mfg. Co. Ltd., Yono, Japan

[22] Filed: Feb. 18, 1975

[21] Appl. No.: 550,671

[52] U.S. Cl. .................................. 303/21 F; 303/61
[51] Int. Cl.² ............................................ B60T 8/04
[58] Field of Search ................... 188/181 A, 181 R; 303/21 F, 61

[56] References Cited
UNITED STATES PATENTS
3,761,140   9/1973   Lewis et al. ........................ 303/21 F

*Primary Examiner*—Duane A. Reger
*Attorney, Agent, or Firm*—Elliott I. Pollock

[57] ABSTRACT

A vehicle brake system comprises an actuator which is hydraulically connected in parallel with a power booster between the master cylinder and wheel cylinders of a vehicle. The hydraulic connections include solenoid control valves normally operative to connect the power booster to the wheel cylinders and to disconnect the actuator from the wheel cylinders. The valves are responsive to electrical signals generated when vehicle skidding occurs to disconnect the power booster from the wheel cylinders, to connect the actuator to said wheel cylinders, and to supply a pulsating fluid pressure from the actuator to the wheel cylinders in place of the steady fluid pressure normally applied to the wheel cylinders from the power booster, thereby to stop the skid.

4 Claims, 2 Drawing Figures

VEHICLE BRAKE SYSTEM

BACKGROUND OF THE INVENTION AND SUMMARY

The present invention relates to a vehicle brake system with an anti-skid device.

In a vehicle brake system of the type in which a power booster is operatively coupled to a master cylinder, the brake liquid to be fed into the wheel cylinders is increased in pressure by the power booster when the brake pedal is depressed. The present invention has for its object to provide a vehicle brake system, of the type described that is provided with an antiskid device which is simple in construction yet highly reliable in operation.

Briefly stated, according to the present invention, an actuator is hydraulically connected in parallel with a power booster in a vehicle brake system, and solenoid control valves, which are controlled in response to the electrical signals from a computer or the like when skidding occurs, are inserted in the brake system. When skidding occurs, the brake liquid, whose pressure is automatically controlled by the actuator in response to the electrical control signals, is fed to the brake wheel cylinders to prevent skidding. When there occurs no skidding, the actuator is automatically disconnected from the brake system while the power booster is automatically connected to the wheel cylinders so as to directly apply the brakes.

DESCRIPTION OF THE PREFERRED EMBODIMENT

Figure 1:
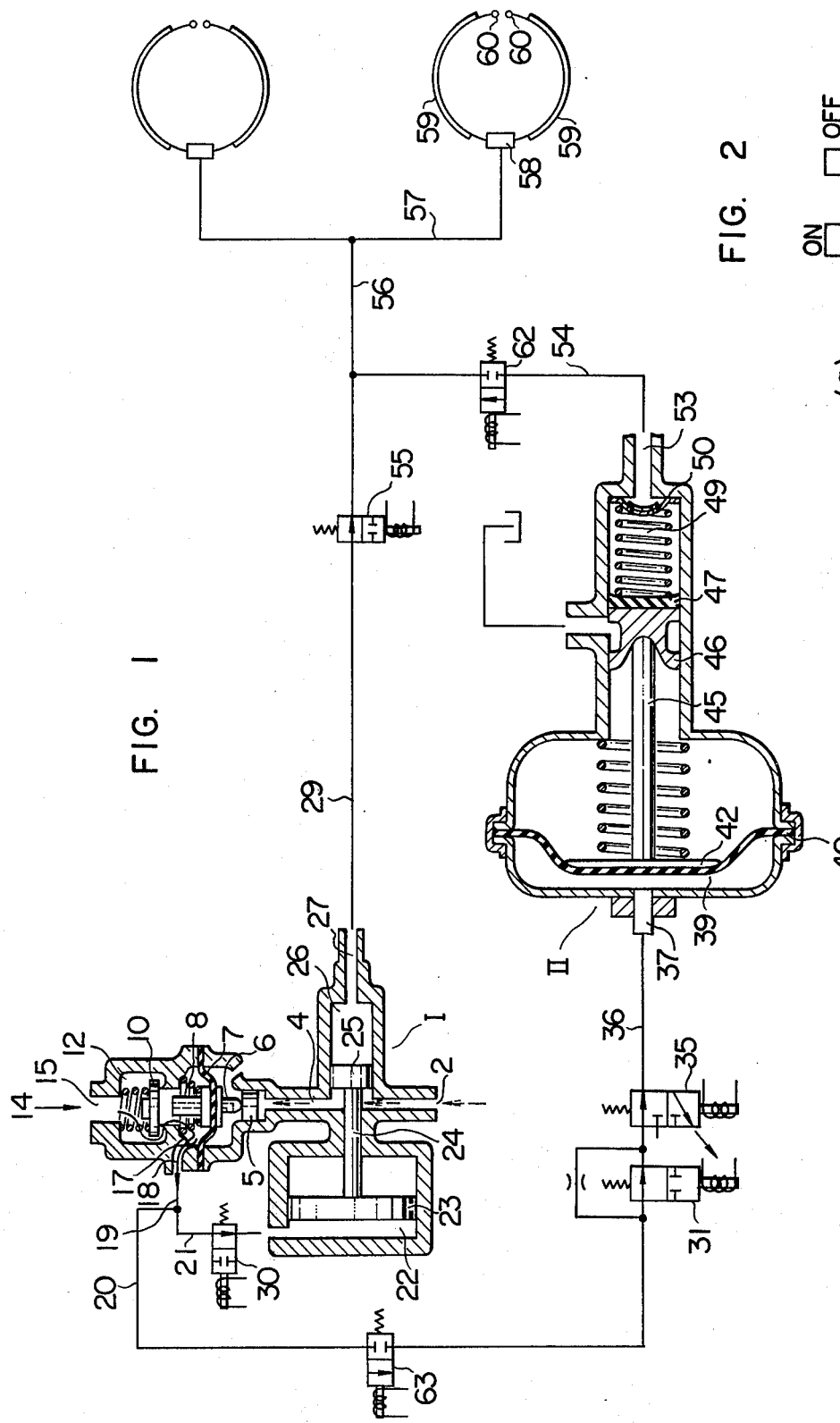
FIG. 1 is a diagrammatic view of one preferred embodiment of an automotive brake system in accordance with the present invention.

Referring first to FIG. 1 illustrating one preferred embodiment of an anti-skid device in accordance with the present invention, when the brake pedal (not shown) is depressed, the liquid under pressure from a master cylinder (not shown) flows into a power booster (I) as indicated by the arrow 1. The liquid under pressure flows through passages 2 and 4, and pushes a piston 5 so that a push rod 6, a diaphragm 7, and a plunger 8 are pushed upwardly. As a result, a valve 10 is also pushed upwardly so that, as indicated by the arrow 14, the liquid under pressure flows through a passage 15, an upper chamber 12, a space between the valve 10 and its valve seat, a lower chamber 17, a passage 18, and hydraulic lines 19, 20, and 21 into solenoid controlled valves 30 and 63. The solenoid controlled valve 63 is, however, closed so that the further flow of the liquid under pressure is interrupted. The liquid under pressure flows through the solenoid controlled valve 30 and the hydraulic line 21 into a left chamber 22, and forces a piston 23 to the right. Therefore, a piston 25, which is connected through a piston rod 24 to the piston 23, is also forced to the right so that the pressure of the liquid in a chamber 26 is increased and the liquid under pressure flow from the chamber 26 through a passage 27, a hydraulic line 29, a solenoid controlled valve 55 into a hydraulic line 56 which is communicated through a hydraulic line 57 with a wheel cylinder 58. Brake shoes 59 pivoted at 60 are therefore forced against a brake drum, whereby the retarding force is applied. A solenoid controlled valve 62 communicated with the hydraulic line 56 is closed so that the brake fluid is prevented from flowing into an actuator (II). The above braking action takes place when tires are not skidding.

Next the mode of operation when skidding occurs will be described. When skidding is detected, a computer (not shown) generates the control signal which is applied to the solenoid control valves 30, 31, 35, 55, 62, and 63. In response to this control signal, the solenoid controlled valve 30 is closed so that the flow of the liquid under pressure from the hydraulic line 21 into the chamber 22 is interrupted. On the other hand, the solenoid controlled valve 63 is opened so that the fluid under pressure flows from the hydraulic line 20 into the solenoid controlled valve 31. The solenoid controlled valve 55 is closed so that the flow of the fluid under pressure from the chamber 26 to the hydraulic line 56 is interrupted. The solenoid controlled valve 62 is opened so that the brake liquid under pressure flows from the actuator (II) through the hydraulic line 54, the valve 62, and the hydraulic lines 56 and 57 into the wheel cylinder 58.

Figure 2:
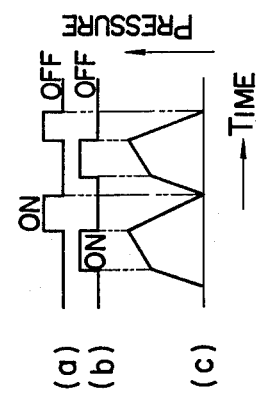
FIG. 2 is a diagram used for the explanation of the mode of operation thereof.

In response to the control signals that are applied to the solenoid controlled valves 31 and 35 from the computer in the manner as shown in FIG. 2(b) and (a) respectively, the pressure of the liquid in a hydraulic line 36 varies as shown at (c) in FIG. 2. This pressure variation is transmitted through a passage 37 to an actuator chamber 39 so that a diaphragm 40 is displaced. The diaphragm 40 is connected through a push plate 42, a push rod 45 and a piston 46 to a rubber cup 47. Therefore, when the diaphragm 40 is displaced to the right, the rubber cup 47 is also displaced to the right so that the pressure is exerted to the liquid in a chamber 49. Thus the pressure variation similar to that shown in FIG. 2(c) is transmitted through holes of a spring seat 50, an outlet port 53, the hydraulic line 54, the solenoid controlled valve 62, and the hydraulic lines 56 and 57 to the wheel cylinder 58. Thus the brake is alternately applied and released so that skidding may be prevented.

When there is no control signal from the computer; that is, when there occurs no skidding, the solenoid control valves 30, 63, 31, 35, 62, and 55 are automatically returned to their initial positions under the force of springs so that the actuator (II) may be automatically disconnected from the brake system. Therefore, the brake fluid under pressure is directly fed to the wheel cylinders in a normal manner.

As described hereinbefore, when skidding is detected, the pressure of the liquid in the actuator (II) is automatically varied in response to the control signals from the computer, and this pressure variation is transmitted to the wheel cylinders while the power booster (I) is automatically disconnected from the brake system. Thus the anti-skidding operation may be automatically carried out. When there occurs no skidding, the actuator (II) is disconnected while the power booster (I) is directly communicated with the wheel cylinders. The anti-skid device in accordance with the present invention is simple in construction yet highly reliable in operation.

What is claimed is:

1. In a vehicle brake system of the type comprising a master cylinder, a power booster adapted to be operatively coupled to said master cylinder, said power booster having an actuating pressure inlet port through which actuating pressure is normally introduced for actuation of said power booster in response to the pressurized fluid from said master cylinder and having a brake pressure outlet port from which brake pressure is normally fed to wheel cylinders of the vehicle through a first hydraulic line in response to actuation of said power booster by said actuating pressure, and an antiskid device in said brake system comprising an actuator hydraulically connected in parallel with said power booster for alternately applying and releasing brake pressure to and from said wheel cylinders independently of said power booster when skidding of the vehicle occurs, a second hydraulic line coupling said actuating pressure inlet port of said power booster to said actuator, a third hydraulic line coupling said actuator to said wheel cylinders, first valve means interposed in said first hydraulic line and operable to effect communication between said brake pressure outlet port of said power booster and said wheel cylinders when the brake is normally applied in the absence of any skidding and operative to interrupt said communication when skidding occurs, second valve means interposed in said second hydraulic line and operable to interrupt communication between said actuating pressure inlet port and said actuator when the brake is normally applied in the absence of any skidding and operative to effect said communication when skidding occurs, discharge valve means interposed in said second hydraulic line between said second valve means and said actuator and operable to effect communication between said second valve means and said actuator when skidding ceases and operative to discharge the pressurized fluid from said actuator when skidding occurs, and third valve means interposed in said third hydraulic line and operable to interrupt communication between said actuator and said wheel cylinders when the brake is normally applied in the absence of any skidding and operative to effect said communication when skidding occurs.

2. The vehicle brake system of claim 1 further comprising throttle valve means interposed in said second hydraulic line between said second valve means and said discharge valve means, said throttle valve means being operable to effect throttled communication between said second valve means and said discharge valve means immediately before skidding occurs and being operative otherwise to effect free communication therebetween.

3. The vehicle brake system of claim 1 wherein each of said valve means comprises a solenoid valve, said system including means for generating electrical signals indicative of the presence of vehicle skidding for controlling the operating state of said solenoid valves.

4. The vehicle brake system of claim 1 wherein said valve means are electrically responsive, and means for coupling electrical control signals to said valve means when skidding is detected, said control signals controlling the operating states of said valve means to operatively disconnect said power booster from said vehicle wheel cylinders while operatively connecting said actuator to said vehicle wheel cylinders in place of said power booster and to supply a pulsating fluid pressure from said actuator to said wheel cylinders.

* * * * *